Feb. 10, 1959 R. V. POUND 2,873,370
MICROWAVE PULSE GENERATOR
Filed Aug. 15, 1955
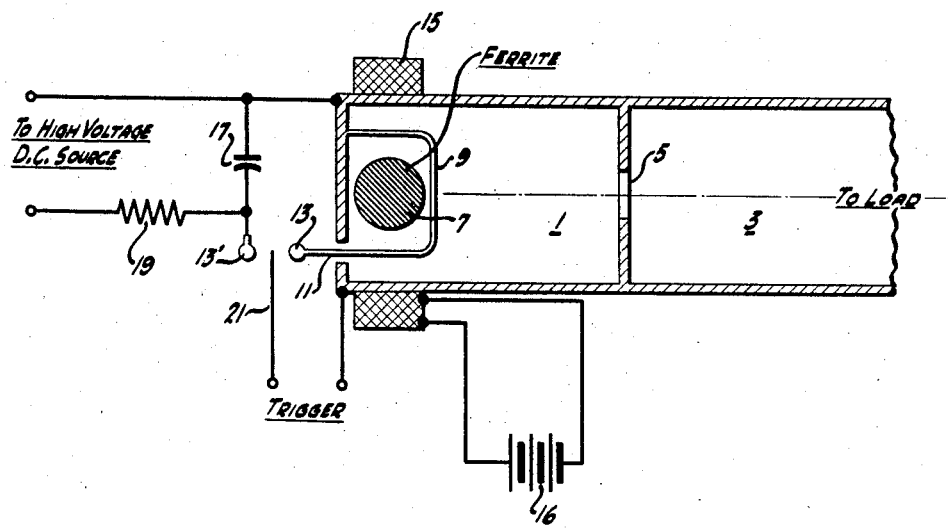
INVENTOR.
ROBERT V. POUND
BY
ATTORNEYS

United States Patent Office 2,873,370
Patented Feb. 10, 1959

2,873,370

MICROWAVE PULSE GENERATOR

Robert V. Pound, Arlington, Mass., assignor to Levinthal Electronics Products, Inc., Redwood City, Calif., a corporation of California Application August 15, 1955, Serial No. 528,415

4 Claims. (Cl. 250—36)

This invention relates to means and methods for generating large pulses of radio frequency power, particularly at frequencies which are in the range extending upward in frequency from about $10^{10}$ cycles per second; i. e., in the range where the free-space wavelengths are in the centimeter to millimeter ranges.

Among the objects of the present invention are to provide means and methods for developing pulses of extremely short duration and high power, to provide means and methods of developing such pulses which do not involve microwave vacuum-tube techniques, and to provide means and methods for developing pulses of higher frequencies and shorter wavelengths than have hitherto been possible except at very low powers. Other objects and advantages will become apparent in a detailed description of a preferred form of the apparatus and in the discussion of its theory of operation which follow.

Since the initial development of radar it has been recognized that the resolution obtainable on a radar screen is an inverse function of the wavelengths of the waves employed in the radar pulses and of the pulse lengths. A consistent effort has therefore been made to increase the frequencies of the waves comprising the pulses and to obtain pulses of very short duration. With regard to the first of these factors, limitations have been imposed by the parameters of the vacuum tubes or other devices used to develop the pulses, the length of the pulses themselves have also been dependent upon the constants of the circuits adapted to the formation thereof.

In accordance with the present invention, the pulses are developed through application of the so-called "gyromagnetic" effect, which is observable in materials which are paramagnetic, ferrimagnetic, or ferromagnetic. While any materials which exhibit these effects may be employed for pulse generation in accordance with this invention, the ferrites are those which are presently preferred, as leading to simpler constructions and more economical apparatus than other materials which can be used for the same purposes, but the other materials mentioned are not considered to be excluded.

The gyromagnetic effect has been investigated by the present inventor, Purcell and Bloembergen, and by F. Bloch, R. Varian, and others. It has been used practically in the measurement of magnetic moments of various nuclei, some paramagnetic substances, and in the construction of magnetometers. The effects relied upon for such purposes have been small, and have required highly sensitive apparatus for their detection. In the present invention, although because of the vary short duration of the pulses the total energy per pulse is small, the rate at which the energy is delivered, and hence the available peak power, may be very large, of the order of megawatts.

Considering the gyromagnetic effect in simplified and purely qualitative terms, the paramagnetic, ferrimagnetic, and ferromagnetic materials respond to the application of a steady magnetic field by developing in themselves a magnetic moment; ferromagnetic materials, in particular, at ordinary temperatures develop very large such moments per unit of applied field, in comparison with the paramagnetic materials. In the classes of materials in which such moments appear, the induced moments are intimately associated with angular momentum of the individual electronic or nuclear constituents, the magnetic effect being attributable, in fact, to the spins of such constituents which are not balanced by spins of others in the opposite direction. The externally observable magnetic moment is therefore associated with angular momentum.

As a result of this angular momentum, any magnetization vector which is found out of parallelism with a magnetic field is caused to precess around the direction of such a field. The behavior of the system is an analogy to that of a top or gyroscope; a top, with its axis away from the vertical, experiences a torque from the forces of gravity, acting outside its point of support, and precesses around the vertical. As the rate of precession of the top is dependent upon the resultant force of gravity, in gyromagnetic phenomena the rate of precession, which continuously changes the direction of the angular momentum, depends upon the force exerted upon the spinning constituents by the magnetic field, and is proportional to the vector product of the magnetization and the field strength. The precessing magnetic vector can develop an oscillating electromagnetic field at the frequency of its precessional movement. Various forces tend to damp out the precession and permit the field and magnetization vectors to come into parallelism, thus reestablishing an equilibrium condition.

As this phenomenon is used in the present invention, a body of material is used which is of the class exhibiting magnetic moments when subjected to a polarizing field and the maximum dimensions of which are determined by the magnitude of the wavelengths which it is desired to generate. This body is coupled magnetically to a resonant circuit which is likewise tuned to the desired frequency, and which is coupled, in turn, to the load intended to be supplied. Considering the wavelengths involved, the preferred form of resonant circuit is a resonant cavity, and the coupling to the load is preferably through a wave guide. Means are provided for subjecting the body of material or "sample" to a polarizing field which is sufficient substantially to aline the elemental magnets or magnetic moments of the body with the field. In the case of the ferrites, the polarizing field can be relatively small, in the neighborhood of 1 to 100 oersteds. Means are provided for suddenly subjecting the body to a very large field acting in a direction normal to that of the polarizing field. The intensity of the field thus suddenly to be applied is proportional to the frequencies in the pulse to be generated; if the desired frequencies are in the range of about 300,000 mc. (resulting in 1 millimeter waves) the applied field should be about 100,000 gauss. It should be applied very rapidly, reaching a maximum within a time of approximately $10^{-9}$ seconds. For 3 cm. waves the required field strength is in the neighborhood of 3000 gauss.

The required large and suddenly applied field can be developed by the discharge of a condenser through a single-turn coil of very low inductance, or by various other means which will be adverted to hereinafter. With paramagnetic materials the original polarizing field must be materially larger, and in order to get as complete a change of direction as possible it may be necessary to interrupt the polarizing field at the instant that the precessing field is applied.

All of the above will be more fully developed in the detailed explanation of a preferred form of the device which follows, particularly when taken in connection with the accompanying drawing, wherein the single figure is a schematic diagram of a pulse generator in accordance with the present invention.

The figure shows, in semi-schematic form, the fundamental circuit of a microwave pulse generator in accordance with the present invention. In this figure a cavity resonator 1, having a mode of oscillation tuned to the frequency which it is desired to produce, is coupled to a wave guide 3 through a suitable iris 5. The wave guide connects to a load, not shown. Such a load may be a horn or other type of antenna or radiator. The type of guide used is not important to the present invention, so long as it will propagate waves of the frequency developed by the generator.

Supported within the cavity is a pellet 7 of a dielectric material having ferromagnetic characteristics, in this case assumed to be a nickel-zinc-iron ferrite, which constitutes the sample. For the moment, the method of supporting the pellet is not important; it may be, for example, cemented to a strut of polystyrene foam, or it may be closely encircled and thus supported by the coil itself.

The dimensions of the ferrite body 7 are dependent upon the wavelengths which it is proposed to generate; for the simplest core the volume of the pellet is in the neighborhood of $(\lambda/2\pi)^3$ where $\lambda$ is the desired wavelength. For 3 cm. waves and a spherical pellet, this means a diameter of no larger than 0.6 cm. For shorter wavelengths the dimensions of the pellet will be in proportion. The wavelength in the ferrite must also be taken into account. In resonators of suitable field configuration larger samples or several pellets properly arranged may be used. Surrounding the pellet 7 is a coil 9, preferably comprising a single turn of conductor, the plane of this coil being in the plane of the magnetic flux within the resonator when oscillating in accordance with the mode which it is intended to excite. The conductor shown is intended to represent a heavy copper strap. As shown, one end of the single-turn coil is connected to the inner wall of the resonator, while the other end is brought out through a suitable aperture 11, in the end wall of the resonator, and terminates in one electrode 13 of a sphere spark-gap. The coil may be spaced slightly from the pellet 7, as shown, or it may surround the pellet closely and serve as its support.

The ferrite body 7 has been referred to as a pellet. Its shape is preferably spheroidal and is determined in large part by demagnetizing effects as well as the shape of the magnetic field developed by current flowing in the conductor 9. The ideal is that when subjected to this magnetic field, the magnetization of all parts of the pellet shall be such as to give saturation, and that the demagnetizing fields developed within the pellet are not such as to require a large polarizing field in order to develop a large magnetic moment. Present design considerations lead to a somewhat oblate spheroidal shape which may, under certain circumstances, approach the lenticular, the spheroid being much flattened. Because of other design considerations it may be desirable that the shape of the pellet be actually spherical or even so prolate as to approach spindle-or-cigar-shape.

Also surrounding the pellet 7 is a polarizing coil 15. Since in the preferred form of the device, where a ferrite is used as a generating body, the polarizing coil 15 can carry direct current, it may be wound on the outside of the resonant cavity without involving material losses. The purpose of this coil is to set up a continuous polarizing field, normal to the field developed by current in the coil 9. It is desirable but not necessary that this field be reasonably uniform in the region where in the pellet lies and with the material chosen may be of the order of magnitude of, say, ten oersteds. It should, in any case, be of sufficient strength substantially to saturate the ferrite, so that the magnetic moment developed therein approaches the possible maxima. A permanent magnet could be used to develop the polarizing field, but as its intensity is relatively low, a coil is shown, excited by a suitable source 16, indicated as a battery.

Means are provided for suddenly passing a very large current through the coil 9. Various means are known for developing such currents as pulses, having a very rapid rise time, and the mechanism shown for this purpose is substantially conventional. A large condenser 17 is provided, one terminal of which connects through the body of the resonator 1 to one terminal of the coil 9. The other end connects to the second terminal electrode, 13', of the ball spark-gap. Also connected to this second terminal is a resistor 19. A high voltage source, just insufficient in voltage to break down the gap 13, 13', is connected across the condenser 17 through the resistor 19. A triggering electrode 21 is interposed between the electrodes of the spark-gap, and connections are provided to the resonator body and electrode 21, across which a triggering pulse may be applied. Such a pulse, adding to the potential between, for example, electrodes 13' and 21, will cause this portion of the gap to break down, following which the second portion, between electrodes 21 and 13, fires, and the condenser 17 immediately discharges through the coil. The gap shown is symbolic only; other forms of gap or other types of switch may be used, the choice will be the one which operates most rapidly.

The field required to be developed by the current in the coil 9 is a function of the wavelength to be produced by the pulse generator. The field required is a direct function of the frequency to be developed, the frequency being proportional to $\gamma H$, where $\gamma$ is the gyromagnetic constant of the particular material used. Thus for the generation of a frequency in the 3 cm. band, with the material here specified, H will be of the order of 3,000 gauss, whereas, were it desired to generate waves in the millimeter region, a field strength in the neighborhood of 100,000 gauss would be necessary.

Furthermore, not only must the magnetizing field thus applied be very strong, but it must be applied very suddenly; with most of the available materials the direction of magnetization must be shifted within an interval of the order of $10^{-9}$ second. The reason for these requirements and the practical expedients whereby they can be met, will next be discussed.

In the ordinary case of changing the direction or intensity of magnetization in a material of the class here described, where the rate of change is relatively slow, the energy expended to effect the change is dissipated as heat. The present invention depends, for its performance, on abstracting a major portion of this energy from the sample, as radiation, before it can be so dissipated. The cavity resonator 1 must be able to absorb this energy more rapidly than it can be dispersed through the sample as thermal agitation. In order to determine the constructional parameters which enable this to be done some theoretical consideration of the mechanisms entering into the process will next be given.

As has been briefly touched upon above, the paramagnetic, ferrimagnetic and ferromagnetic materials, when subjected to a magnetizing field develop magnetic moments which, in equilibrium, are parallel to the applied field $\bar{H}$ and may be represented by a magnetization vector $\bar{M}$. In the case of the ferromagnetic materials these moments may be very great with even small applied magnetizing fields. For small fields the moments, per unit of applied field strength are smaller for ferrimagnetic materials and still smaller for paramagnetic materials. With paramagnetic materials the moments are proportional to the applied field but with ferri- and ferromagnetic materials this linearity does not exist, the ratio of the magnetic moment to the applied field decreasing with increasing field strength as magnetic saturation is approached. For the purposes of this specification the ferri-magnetic case and the ferromagnetic case will be considered together, for while there are theoretical differences the over-all effects are similar and hence when ferromagnetism is referred to, ferrimagnetism may be considered to be included.

If the direction of the magnetizing field is suddenly changed the magnetization vector cannot follow it instantly, because of the angular momentum associated with the magnetic moment. Instead it precesses around the new direction of the field vector $\bar{H}$ at an angular frequency usually designated as $\gamma H_e$, where $\gamma$ is the gyromagnetic ratio, and $H_e$ is an effective field that includes the applied field and demagnetizing fields which are dependent upon the sample shape. The precessing magnetization vector $\bar{M}$ develops a circularly-polarized wave when properly coupled to the cavity. The energy available in the oscillations thus produced is $M_0 H_0 (1+\cos\theta)$ per unit volume of the sample where $\theta$ is the angle between $\bar{M}_0$ and $\bar{H}_0$ and the subscript indicates the instant of application of the field in the new direction. If, for simplicity, the cavity is visualized as its equivalent circuit, a tuned coil coupled to a load through the oscillating flux, the rate at which this energy is available is found to be $$P = 2\eta H_0 M_0^2 Q \gamma \sin^2 \theta \qquad \text{Equation 1}$$

where $\eta$ is a fraction representing the efficiency of coupling or "filling factor" between the sample and the coil. It is the ratio of the oscillating field of the sample to that of the cavity, integrated over the volumes thereof. If the magnetic field within the cavity is uniform when oscillating in accordance with the desired mode, $\eta$ becomes the ratio of the two volumes, and can be so considered to a first approximation in the practical case. Q is the conventional quality factor of the circuit when loaded by the transmission line, resonant at the precession frequency. The rate at which power is delivered is not a simple proportion to the stored energy and hence the change in P is not a simple exponential. The quantity $\theta$ is, however, a function of time which can be expressed by the equation $$\tan \theta/2 = EXP(-2M_0 Q \eta \gamma t) \qquad \text{Equation 2}$$

Equation 2 holds for $$\theta = \frac{\pi}{2} \text{ at } t = 0$$

From it can be derived a quantity:

$$T_r = \frac{1}{2\pi \eta M_0 Q \gamma} \qquad \text{Equation 3}$$

which may be termed the radiation damping time constant, most of the energy of the system escaping within this period. $T_r$ has to do both with the time during which energy is available in the sample and the time required to transfer the available energy to the circuit.

$T_r$ must be kept short in comparison with both the longitudinal relaxation time-constant $T_1$ and the transverse relaxation time constant $T_2$ of the material of the sample. These represent respectively the appearance of the component $\bar{M}$ parallel to $\bar{H}$ and its disappearance in the plane normal to $\bar{H}$. $T_1$ may be considered as primarily due to the dissipation of energy through transfer to thermal agitation, already discussed. $T_2$ may be considered as in a sense due to inhomogeneities in the material. The assigned value of M is a resultant of a number of spins, and in a sample of a composite nature the component moments will differ in some degree. Since the gyromagnetic torque and the frequencies developed as a result thereof contain M as a factor, the result will be that a number of frequencies will be developed, grouped about an average frequency. In any sample the frequencies thus developed will be statistically distributed, the distribution following very closely the shape of the familiar resonance curve. Such a curve is normally defined as having a width which is measured between the half-power points, hence a given sample of material is defined as having a line-width between the half-power points of its frequency response curve, and since these points are related to the distribution of the magnetic moments M it is convenient to designate the line-width in terms of gauss. The line-width of ferrites of the type here chosen for illustration has been found by experiment to be about 74 gauss. It may be noted that variations in the quantity $H_e$ throughout the volume of the sample will have a similar effect. Variations of this latter character, are, however, dependent upon electromagnetic design and not inherent in the materials used and, therefore such variations may for the moment be neglected particularly since they can be made small in comparison with the line-width which is an inherent quality of the material of the sample.

At the instant of application of the precession field the oscillations generated by the precessions will be in phase, and hence additive in effect. As the precession continues however, the various component oscillations will become more and more out of phase until they effectively cancel. Eventually the energy of the component oscillations becomes distributed throughout the sample, and is dissipated in heat, as in the case of the longitudinal relaxation which is measured by $T_1$. The sample is effective as a source of externally observable oscillations only so long as there is a degree of homogeneity in phase between the various component oscillations and hence a considerable additive effect between them, which implies that the time-constant $T_r$ must be short in comparison with $T_2$. Translating line-width in terms of the angular velocity of the magnetic vector, if the line width as observed with a specific sample is $\Delta\omega$ radians per second, then $$T_2 = \frac{2}{\Delta\omega}$$

$\Delta\omega$ being the line-width expressed in gauss, times the gyromagnetic constant $\gamma$ of the material of the sample. A major portion of the magnetic energy is delivered as R. F. power if $T_r$ is smaller than $T_2$; i. e., if the available energy is delivered to the cavity before its components fall out of step.

The ability to make effective use of the R. F. power available in the sample in the present device is not dependent solely upon the availability of energy in the sample but also upon the ability of the circuit into which it is coupled to absorb the energy; i. e., the major cause of damping must be the useful load. The circuit itself must also have a short time-constant $$\frac{Q}{\omega_0}$$

relative to $T_r$, $\omega_0$ being the angular velocity of the vector corresponding the mid-frequency of the gyromagnetic resonance curve.

It can be shown that the quantity $$\left(\frac{QT_r}{\omega_0}\right)^{1/2}$$

is related to the time of transfer of the stored magnetic energy from the sample to the circuit. If $$\frac{Q}{\omega_0}$$

is larger than $T_r$, the circuit will pass what energy it has not caused to be otherwise dissipated back to the sample and the process will repeat. The effect is that of an overcoupled, double-tuned circuit, one part of which is initially excited. In the present device, however, the energy storable in the magnetic element is limited to $2M_0 H_0$. This results in a non-linearity which complicates the exact quantitative solution of the problem. In general, however, the excitation of the circuit will be periodic with an angular frequency of about $$\left(\frac{\omega_o}{QT_r}\right)^{1/2}$$

and the power available from the cavity resonator will be amplitude modulated at that rate. For the majority of the stored magnetic energy to be dissipated as usable energy, $$\frac{Q}{\omega_o}$$

must be no greater than $T_2$.

We may now consider the conditions to be met in a pulse generator in accordance with the present invention, designed to develop pulses in the X-band; i. e., pulses having a radio frequency of $10^{10}$, where $\omega_o = 2\pi \times 10^{10}$. $\gamma$ may be taken equal to about $2 \times 10^7$, and hence, since $\omega = \gamma H_e$, the necessary value for $H_e = \pi \times 10^3$ or something over 3000 gauss, as was indicated above.

The value of $M_o$, for a ferrite, for the composition here taken as illustrative, will be in the neighborhood of 300 gauss. To obtain such polarization, the value of the field developed by the polarizing coil 15 will be from 1 to 10 gauss. Substituting the values for $M_o$ and in the Equation 3 given above:

$$T_r = \frac{2.7 \times 10^{-11}}{\eta Q}$$

With a line-width of 74 gauss, $$T_2 = \frac{\gamma}{\Delta\omega} = 1.35 \times 10^{-9}$$

approximately.
If $$\frac{Q}{\omega_o}$$

is to be no greater than $T_r$, $$\frac{Q}{\omega_o}$$

can be equated to $T_r$, and substituting the values already given for the various factors in Equation 3, the equation can be written:

$$\frac{Q}{\omega_o} = \frac{Q}{2\pi \times 10^{10}} = \frac{2.7 \times 10^{-11}}{Q} = T_r$$

or $$\eta Q^2 = 1.7$$

The value of $T_2$, for the material chosen for illustration was found above to be $1.35 \times 10^{-9}$ sec., and $T_r$ should be short in comparison. Arbitrarily deciding to make $$\frac{T_2}{T_r} = 5$$

$\eta Q$ then must be 0.1, in which case $Q = 17$, and $$\eta = \frac{1}{170} = 0.0059$$

As the volume of the sample has been taken as 0.11 cm.³ approximately, the volume of the cavity will be in the neighborhood of 18.5 cm.³; the equivalent of a cube a little over 2.5 cm. on a side. If the ratio $$\frac{T_2}{T_r}$$

is taken as 10, $Q = 34$ and $\eta = 0.003$. The cavity would then have a volume of about 3.3 cm.³.

It is to be realized that the value of Q is its effective value, when the cavity is loaded by the line to which it delivers its power. It is also to be borne in mind that the values given for the volume of the cavity assume that the magnetic field is uniform therein at the mode of oscillation excited by the pulse; if the magnetic field is non-uniform throughout the cavity the value of $\eta$ will differ from the ratio of volumes of sample to the cavity, and will depend in addition on the position within the cavity where the sample is placed.

The choice of values for $\eta$ and Q as set forth above is analogous to the choice of parameters which will give critical coupling, and maximum energy-transfer between two oscillatory circuits, the quantity $\eta$ being related to, although not identical with, the coefficient of coupling as used in the more familiar type of circuit design. As in the familiar case, critical coupling is frequently, but not always, desirable, and this invention is not limited to the critically-coupled case which has been selected for illustration as the most generally useful.

Furthermore, although a rectangular resonant cavity has been shown as one which is simple and relatively easy to compute as to the value of the field excited therein by various modes of oscillation, cavities of many shapes and sizes can each be made to oscillate in accordance with many modes. Ordinarily the choice will be a simple shape, which will respond to the desired frequency in accordance with one of its simplest modes, but this is not a requirement for the practice of the invention. Complex cavities and higher modes of oscillation can be employed if this appears desirable for any reason.

Paramagnetic bodies can also be used for the sample or pellet 7. Preferably those chosen will be materials having a large concentration of free electrons, such as the organics, diphenyl-picryl-hydrazyl or tris-p-nitro phenyl-methyl, for example. Many paramagnetic materials have narrower line-widths than the ferro- or ferrimagnetic materials and hence the relaxation time $T_2$ is longer and the gyromagnetic energy need not be withdrawn so rapidly, which is an advantage. On the other hand the polarizing field required to give the initial magnetic moment is much greater and the microscopic magnetic moment smaller, and hence it may be necessary to interrupt the polarizing field to give an adequate angle between that moment and the direction of the precessing field.

The higher the frequency desired in the pulses produced the less important is the line-width of the sample. $T_2$ is a constant for a given sample, but at higher frequencies its ratio to the period of oscillation becomes larger and the gyromagnetic resonance curve becomes relatively sharper.

It has been specified that the sample be a dielectric. It will be evident that this is the case, since otherwise the precessing fields would set up circulating currents in the sample and dissipate in $I^2R$ losses the energy which should be radiated.

From the above it should be evident that the invention can be embodied in a multiplicity of forms and is not limited to the form illustrated. Its scope is that set forth in the following claims and is limited only as limitations are expressed therein.

What is claimed is:

1. A generator of high power pulses of microwave energy comprising a body of a material having a known gyromagnetic ratio $\gamma$, means for establishing a polarizing magnetic field through said body, means for suddenly subjecting said body to a magnetizing field having a component of intensity H transverse to said polarizing field, a cavity resonator surrounding said body and having a resonant mode of electrical angular velocity $\omega$ equal to $\gamma H$ coupled with said body, and a load circuit coupled to said cavity resonator.

2. A generator of high power pulses of microwave energy comprising a body of a material having a known gyromagnetic ratio $\gamma$ and a transverse relaxation time constant $T_2$, means for establishing a polarizing magnetic field through said body, means for suddenly subjecting said body to a magnetizing field having a component of intensity H transverse to said polarizing field, a cavity resonator surrounding said body and having a resonant mode of electrical angular velocity $\omega$ equal to $\gamma H$ coupled with said body, and a load circuit coupled to said cavity resonator so as to give to the system comprising said body, cavity resonator and load circuit a radiation damping time constant shorter than $T_2$.

3. A generator of high power pulses of microwave energy comprising a cavity resonator, a load circuit coupled thereto, a pellet of ferrite mounted within said resonator, a single-turn coil surrounding said pellet, means for magnetically polarizing said pellet in a direction transverse to the axis of said coil, means for accumulating an electrical charge, and switching means for suddenly discharging said charge through said single turn coil.

4. A generator of high power pulses of microwave energy comprising a cavity resonator, a load circuit coupled thereto, a pellet of ferrite mounted within said resonator, a single-turn coil surrounding said pellet, a multi-turn coil surrounding said resonator and said pellet the axis of said multi-turn coil being substantially normal to that of said single-turn coil, terminals for connecting said multi-turn coil to a source of direct current to produce a polarizing magnetic field through said pellet, means for accumulating an electrical charge, and switching means for suddenly discharging said charge through said single turn coil.

References Cited in the file of this patent
UNITED STATES PATENTS

| | | |
|---|---|---|
| 2,561,489 | Bloch | July 24, 1951 |
| 2,589,494 | Huschberger | Mar. 18, 1952 |
| 2,647,239 | Tellegen | July 28, 1953 |
| 2,697,171 | Little | Dec. 14, 1954 |
| 2,712,069 | Goldstein | June 28, 1955 |
| 2,762,871 | Dicke | Sept. 11, 1956 |

UNITED STATES PATENT OFFICE

Certificate of Correction

Patent No. 2,873,370                                                   February 10, 1959

Robert V. Pound

It is hereby certified that error appears in the printed specification of the above numbered patent requiring correction and that the said Letters Patent should read as corrected below.

Column 1, line 63, for "vary" read —very—; column 5, line 15, for "$(1+\cos \theta)$" read —$(1-\cos \theta)$—; line 60, after "component" insert —of—; column 7, line 68, for "3.3 cm.$^3$" read —$(3.3 \text{ cm.})^3$—.

Signed and sealed this 2nd day of June 1959.

[SEAL]

Attest:
KARL H. AXLINE,
*Attesting Officer.*

ROBERT C. WATSON,
*Commissioner of Patents.*